(12) United States Patent
Amonou et al.

(10) Patent No.: US 7,650,430 B2
(45) Date of Patent: Jan. 19, 2010

(54) METHOD AND DEVICE FOR TRANSMITTING DATA ASSOCIATED WITH TRANSMITTED INFORMATION

(75) Inventors: Isabelle Amonou, Thorigne Fouillard (FR); Yves Acket, Rennes (FR); Franck Geslin, Rennes (FR)

(73) Assignee: France Telecom SA, Paris (FR)

( * ) Notice: Subject to any disclaimer, the term of this patent is extended or adjusted under 35 U.S.C. 154(b) by 706 days.

(21) Appl. No.: 10/969,247

(22) Filed: Oct. 21, 2004

(65) Prior Publication Data

US 2005/0198184 A1    Sep. 8, 2005

(30) Foreign Application Priority Data

Oct. 21, 2003   (EP)   .................................. 03292626

(51) Int. Cl.
*G06F 15/16*   (2006.01)
(52) U.S. Cl. ........................ 709/246; 709/217; 709/238; 709/239; 709/240; 725/401
(58) Field of Classification Search ................. 709/206, 709/207; 725/40
See application file for complete search history.

(56) References Cited

U.S. PATENT DOCUMENTS

| | | | | |
|---|---|---|---|---|
| 6,138,147 A | * | 10/2000 | Weaver et al. | ................ 709/206 |
| 6,415,135 B1 | * | 7/2002 | Salomaki | ...................... 455/45 |
| 6,642,966 B1 | * | 11/2003 | Limaye | ...................... 348/473 |
| 7,073,193 B2 | * | 7/2006 | Marsh | ........................ 725/114 |
| 2001/0003813 A1 | * | 6/2001 | Sugano et al. | ............... 704/500 |
| 2001/0056506 A1 | * | 12/2001 | Munetsugu et al. | ......... 709/310 |
| 2002/0170068 A1 | * | 11/2002 | Rafey et al. | ................. 725/112 |

\* cited by examiner

*Primary Examiner*—William C Vaughn, Jr.
*Assistant Examiner*—Mohamed Ibrahim
(74) *Attorney, Agent, or Firm*—Lowe Hauptman Ham & Berner LLP

(57) ABSTRACT

Data associated with transmitted information over a communication network are transmitted. The data are divided into data groups. An information item representative of the importance of the data of the data group is associated with each data group. A transmission cycle for the data groups is determined. Each data group is inserted into the determined transmission cycle a number of times depending on the importance of the data of the data group.

15 Claims, 4 Drawing Sheets

METHOD AND DEVICE FOR TRANSMITTING DATA ASSOCIATED WITH TRANSMITTED INFORMATION

RELATED APPLICATION

The present application is based on, and claims priority from, EP Application Number 03 292626.3, filed Oct. 21, 2003, the disclosure of which is hereby incorporated by reference herein in its entirety.

FIELD OF INVENTION

The present invention relates to a method and a device for transmitting data associated with transmitted information.

More specifically, the invention is situated in the field of data transmission over a communication network that may be, for example, a data broadcast network or a telecommunication network such as an Internet network.

BACKGROUND ART

The information transmitted so as to be displayed by devices for displaying information for users is for example, and in a non-limiting manner, audiovisual information broadcast by television channels, audio information or text information.

The data associated with this information are for example data representative of the transmitted audiovisual information and/or data comprising information for configuring a means of decoding the audiovisual information and/or data for indicating the communication network and/or attribute data of the audiovisual information.

The data representative of the audiovisual information are customarily referred to as metadata. The metadata are for example, and in a non-limiting manner, the guide to the transmitted audiovisual programmes, or to a predetermined audiovisual programme, data descriptive of this programme, such as its title, a summary and/or detailed description of the programme, a descriptor of one or more actors appearing in the audiovisual programme or one or more reviews of the programme.

According to the DVB or Digital Video Broadcast standard, it is possible to transmit data representative of the content of broadcast audiovisual programmes. These data conform to the DVB-SI standard. DVB-SI is the acronym for Digital Video Broadcast Service Information. The audiovisual programmes are in this case encoded according to the MPEG or Motion Picture Expert Group standard, and the data representative of the content of the broadcast audiovisual programmes are broadcast in the form of data tables on the same broadcast channel as the audiovisual programmes.

The data tables are transmitted periodically on the broadcast channel so that a receiver may receive them at any moment.

According to this standard, the data associated with the broadcast audiovisual programmes are all broadcast periodically. Moreover, it is not possible for a receiver receiving these data to receive only the latter. Because these data are transmitted on the same channel as the audiovisual programmes, the receiver must receive both the data associated with the audiovisual programmes and the audiovisual programmes, even if only the data associated with the audiovisual programmes are useful to the receiver.

Moreover, the periodic transmission of these data according to this same standard is not adapted to communication networks that do not guarantee a constant bandwidth.

Recommendation RFC 2974, which is known under the acronym SAP, for Session Announcement Protocol, provides for the periodic transmission of session announcement packets on a broadcast channel. These session announcement packets are associated with multimedia conference sessions on the Internet network which are transported over the Internet network on channels that are different from the session announcement packet broadcast channel.

According to this recommendation, a single type of data is transmitted, in this case session announcement packets.

Thus, the solutions proposed in the prior art do not address the problems associated with the transmission of data comprising a plurality of data, in which the importance of the data with respect to one another has to be respected despite variations in the conditions on the communication network.

These same solutions of the prior art do not allow optimization of the time taken to receive data associated with information as a function of their importance.

The aim of the invention is to overcome the drawbacks of the prior art by proposing a method and a device which make it possible to transmit over a communication network data of varying importance while ensuring a minimum time taken to receive these data as a function of their importance with respect to one another.

SUMMARY OF THE INVENTION

To this end, according to a first aspect, the invention proposes a method of transmitting data associated with transmitted information over a communication network, characterized in that the data are divided into data groups, an information item representative of the importance of the data of the data group is associated with each data group, and in that the method comprises the steps of determining a transmission cycle for the data groups and inserting each data group into the determined transmission cycle, each data group being inserted a number of times depending on the respective importance of the data of the data group.

Correlatively, an aspect of the invention relates to a device for transmitting data associated with transmitted information over a communication network, characterized in that the data are divided into data groups, an information item representative of the importance of the data of the data group is associated with each data group, and in that the device comprises means for determining a transmission cycle for the data groups and means for inserting each data group into the determined transmission cycle, each data group being inserted a number of times depending on the respective importance of the data of the data group.

It is thus possible to transmit data, the importance of which varies for the devices receiving these data.

By inserting the important data groups a number of times into one and the same transmission cycle, the time taken to receive the important data is reduced.

According to another aspect of the invention, the communication network is a broadcast network and the information and data are transmitted over the broadcast network.

It is thus possible to transmit over a broadcast network data comprising a plurality of data, the importance of which varies for the devices receiving these data.

By inserting the important data groups a number of times into one and the same transmission cycle, the time taken to receive the important data is reduced.

According to another aspect of the invention, the communication network is a telecommunication network. The information is transmitted on a transmission channel of the telecommunication network and the data are transmitted on a predetermined channel of the telecommunication network which is different from the channel on which the information is transmitted.

It is thus not necessary to decode the data and the information with which the data are associated for use only of the data. This is because only the data associated with the information may be useful initially to the processing device which receives these data or to the user. By separating the transmission channels, it is possible to process only the data transmitted on the predetermined channel and therefore to reduce the complexity of the processing to be carried out by the processing device which receives these data.

According to another aspect of the invention, each time a data group is inserted into the transmission cycle for the data groups, the inserted data group is transmitted.

Thus, the transmission of the data groups takes place in real time and the amount of data that has to be stored prior to transmission is reduced.

According to another aspect of the invention, if a data group is inserted into the transmission cycle a number of times, the insertions of the data group are spaced apart by a predetermined number of insertions of other data groups into the transmission cycle.

Thus, by spacing apart the insertions of a data group by a predetermined number of insertions of other data groups in the transmission cycle, when a processing device connects to the telecommunication network it receives within a short amount of time the important information group or groups. The amount of time taken to receive these important data groups is therefore reduced.

Furthermore, by spacing apart the insertions of a data group by a predetermined number of insertions, the data group is transmitted with a periodicity that depends on the time taken to transmit the other inserted data groups and thus allows possible fluctuation of this periodicity.

According to another aspect of the invention, the data groups are inserted into the transmission cycle in an order which depends on their importance compared to the other data groups.

Thus, by firstly inserting the most important data groups into the transmission cycle, the insertion of these important groups a number of times and with a certain periodicity in a transmission cycle is facilitated. Moreover, even if the time interval between two transmission cycles is long, a processing device connecting to the telecommunication network between two transmission cycles receives the data groups within an optimized amount of time.

According to another aspect of the invention, the data groups are ordered as a function of their importance. A counter is associated with each data group, the value of each counter being representative of the minimum number of insertions of other data groups before an insertion of the data group with which each counter is associated in the insertion cycle, and the data group to be inserted is determined as a function of the order of the data groups, the value of the associated counters and the number of times that at least one data group has been inserted into the transmission cycle.

According to another aspect of the invention, prior to the first insertion of a data group into the transmission cycle each counter is set to a predetermined value, each time a data group is inserted the counter associated with the inserted data group is set to a value equal to the number of insertions of other data groups spacing apart the insertions of the data group with which the counter is associated, and each time a data group is inserted into the transmission cycle the value of each counter associated with the other data groups is decremented.

According to another aspect of the invention, each time a data group is inserted the first of the ordered data groups is taken as the current data group and a check is made to ascertain whether the value of the counter associated with the current data group is strictly greater than the predetermined value, or if the current data group has been inserted into the transmission cycle a predetermined number of times the next data group of the ordered data groups is considered to be the current data group.

According to another aspect of the invention, the moment of insertion of a data group is determined on the basis of the size of the previously inserted data group or groups and on the bandwidth of the transmission channel.

Thus, by taking account of the bandwidth of the transmission channel, any problems associated with saturation of the latter are avoided.

According to another aspect of the invention, the total number of insertions of data groups to be inserted into the transmission cycle is determined, and once the data groups have been inserted into the transmission cycle a number of times that is equal to the total number of insertions there is a wait for a predetermined period of time, a new transmission cycle is determined and information groups are inserted into the determined new transmission cycle.

According to another aspect of the invention, the predetermined period of time is zero.

According to another aspect of the invention, the transmission cycle comprising the inserted data groups is analysed and the bandwidth of the transmission channel and/or the information items representative of the importance of the data of at least one data group is/are modified as a function of the analysis of the transmission cycle.

It is thus possible to modify the transmission cycle in real time and as a function for example of the size of the transmitted data groups. This analysis and modification make it possible to guarantee an optimal time taken to receive the important data groups.

According to another aspect of the invention, the information is audiovisual information and the data are data comprising information for configuring a means of decoding the audiovisual information and/or data representative of the content of the transmitted audiovisual information and/or data for indicating the or each channel of the telecommunication network which comprises the transmitted information and/or attribute data of the audiovisual information.

It is thus possible to transmit different types of data on one and the same channel while maintaining an optimal time taken to receive important data groups. These data may thus be data for configuring decoding means or information for obtaining information required to receive the information with which the data are associated, or even other data which allow a user receiving these data to be informed about or to select the audiovisual information that he wishes to receive.

Since the advantages of the devices are identical to those mentioned in respect of the methods, said advantages will not be repeated.

The invention also relates to the computer program stored on a data carrier, said program comprising instructions that make it possible to implement the method described above, when it is loaded and executed by a computer system.

The abovementioned features of the invention and other features will emerge more clearly upon reading the following description of one example of embodiment, said description being given with reference to the attached drawings.

DETAILED DESCRIPTION OF THE DRAWING

Figure 1:
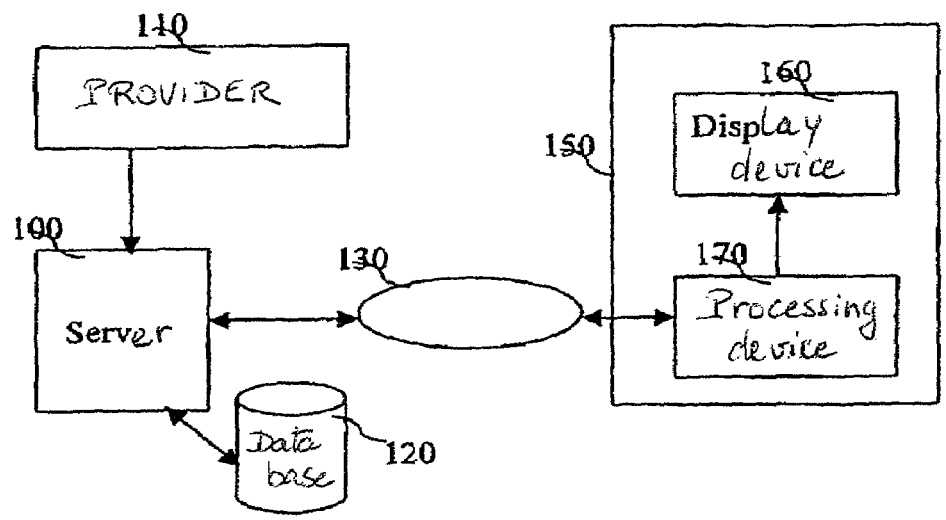
FIG. 1 is a block diagram of a preferred embodiment of a data transmission system according to the present invention.

FIG. 1 is a block diagram of a preferred data transmission system according to the present invention.

The system for transmitting data associated with information comprises a transmission device such as a server 100 able to transmit a plurality of data groups in a determined transmission cycle.

An information provider 110 delivers information, such as an audiovisual programme for example, to the server 100.

The information provider 110 also delivers to the server 100 data associated with the audiovisual programmes. These data may also be delivered by other providers not shown in FIG. 1.

These data are delivered for example in the form of data groups, each data group comprising data of a predetermined type. As a variant, the server 100 receives these data, forms data groups and associates with each data group an information item representative of the importance of the data contained in each group.

A database 120 is associated with the server 100. This database 120 is remote from the server 100. It may of course be integrated in the server 100.

The database 120 contains, for example, data that are complementary to the metadata delivered by the information provider 110.

The server 100 associates the data delivered by the information provider 110 and the data contained in the database 120, to (1) form a data group comprising these data, (2) insert said data groups into the transmission cycle and (3) transfer them to the processing devices 170 of the users 150.

The server 100 distributes these programmes to users 150 via the telecommunication network 130, such as an Internet network for example.

When the users 150 are subscribed to the information distribution service, these audiovisual programmes are transmitted via one or more transmission channels of the Internet network 130 to the respective processing devices 170 of the users 150 via the Internet network 130.

The server 100 also delivers to the processing devices 170 of the subscribers 150, simultaneously with the broadcasting of these audiovisual programmes, the various data groups inserted into a transmission cycle and transmitted on a broadcast channel of the telecommunication network 130. This channel is preferably a different transmission channel from the channel or channels on which the audiovisual programmes are transmitted.

The data associated with this information are transmitted in the form of data groups. A data group comprises data representative of the transmitted audiovisual information or data comprising data for configuring a means of decoding the audiovisual information or data for indicating the telecommunication network or attribute data of the audiovisual information.

Associated with these data groups are information items representative of the importance of the data contained in these data groups.

Associated with the data group comprising data for indicating the telecommunication network used by the telecommunication means contained in the processing device 170 is an information item representative of the importance of these data. These data are essential for the telecommunication means contained in the processing device 170. The information item representative of the importance of these data reflects the essential nature of the latter.

Associated with the data group comprising data for configuring an audiovisual information decoding means contained in the processing device 170 is an information item representative of the importance of these data. These data are highly important for the audiovisual information decoding means contained in the processing device 170. The information item representative of the importance of these data reflects the highly important nature of the latter.

Associated with the data groups comprising data representative of the transmitted audiovisual information or attribute data of the audiovisual information are information items representative of the importance of these data. For these data groups, the information items representative of the importance of these data reflect the less important nature of the latter compared to the data groups mentioned above.

The server 100 determines the transmission cycle for these data groups in accordance with the algorithm which will be described with reference to FIGS. 3a and 3b.

The server 100 transmits these data groups in accordance with the algorithm which will be described with reference to FIG. 4.

The server 100 analyses the transmission cycles and if necessary modifies the transmission parameters in accordance with the algorithm which will be described with reference to FIG. 5.

The audiovisual programmes and the associated data are decoded by the processing device 170 and displayed on the screen of the processing device 170 or, as a variant, are transferred in a suitable format to a device 160 for displaying audiovisual information, such as a television set for example.

It should be noted here that, in one variant embodiment, the communication network 130 may also be a wireless, satellite or cable broadcast network in which the information and the data groups inserted in a transmission cycle according to the invention are broadcast in accordance with the DVB standard.

Figure 2:
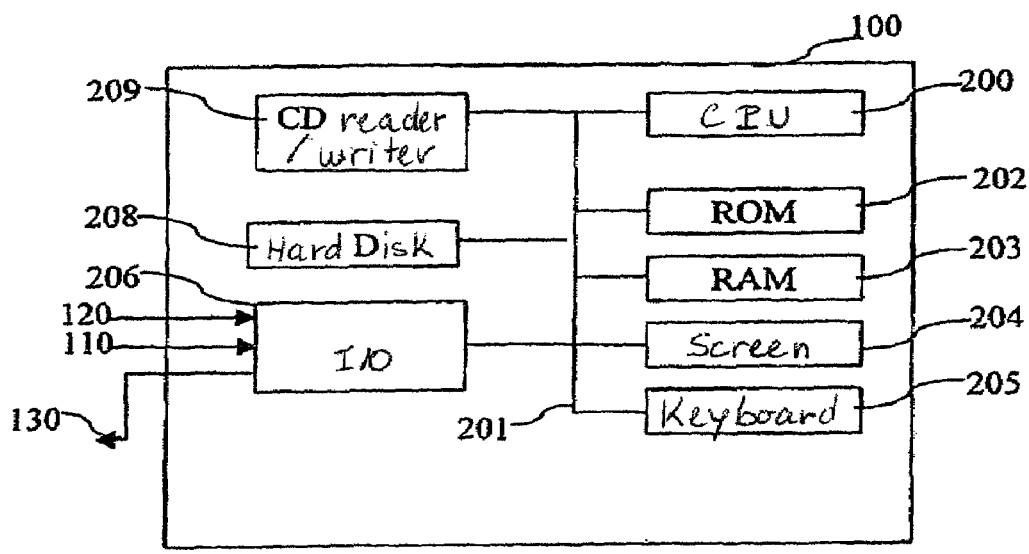
FIG. 2 is a block diagram of a preferred embodiment of the various elements that make up the data transmission device of the present invention.

FIG. 2 is a block diagram of the various elements that make up the data transmission device of a preferred embodiment of the present invention.

This transmission device 100 or server is able to form groups of data associated with information, for example audiovisual information, to determine a transmission cycle for these data groups, to insert each data group into the determined transmission cycle a number of times depending on the respective importance of each data group, to transmit these data groups and to analyse the transmission cycle formed.

The device 100 is for example a microcomputer. It may also be integrated in a means of broadcasting metadata to an information display device, such as a television set, or integrated in a device for transmitting data to receiving terminals, such as mobile telephones for example.

The device 100 comprises a communication bus 201 to which there are connected a processor 200, a read-only memory 202, a random-access memory 203, a screen 204, a keyboard 205, a hard disk 208, a compact disc or CD reader/writer 209 and a communication interface 206.

The hard disk 208 stores the programmes that implement the invention and also the variables which allow the transmission of data according to the invention.

The hard disk 208 thus stores the programs comprising instructions which allow the algorithms shown in FIGS. 3a, 3b, 4 and 5 to be implemented.

The data are for example data representative of the transmitted audiovisual information and/or data comprising information for configuring a means of decoding the audiovisual information and/or data for indicating the predetermined channel of the telecommunication network and/or attribute data of the audiovisual information.

These programs and these data may also be read via the compact disc or received via the telecommunication network 130.

More generally, the programs according to the present invention are stored in a storage medium. This storage medium can be read by a computer or a microprocessor 200. This storage medium may or may not be integrated in the device, and may be removable.

When the server 100 is powered up, the programs according to the present invention are transferred into the random-access memory 203 which then contains the executable code of the invention and also the data necessary to implement the invention.

Via the input/output interface 206, the server 100 receives from the provider 110 audiovisual information and also data associated with this information. These data are for example metadata in accordance with the DVB-SI standard.

The server 100 is also connected via the input/output interface 206 to a database 120 which comprises metadata that may be associated with metadata in accordance with the DVB-SI standard received from the provider 110.

The interface 206 also allows the transmission of the data and of the information with which said data are associated to one or more users 150 via the telecommunication network 130.

The server 100 comprises a screen 204 and a keyboard 205 serving as a man/machine interface and thus making it possible for example to define priorities between the various transferred data groups. The screen 204 and the keyboard 205 also make it possible to modify the transmission parameters for the data groups. These parameters are for example the bandwidth allocated to the transmission of the data groups and/or the importance of the data contained in each data group.

Figure 3A:
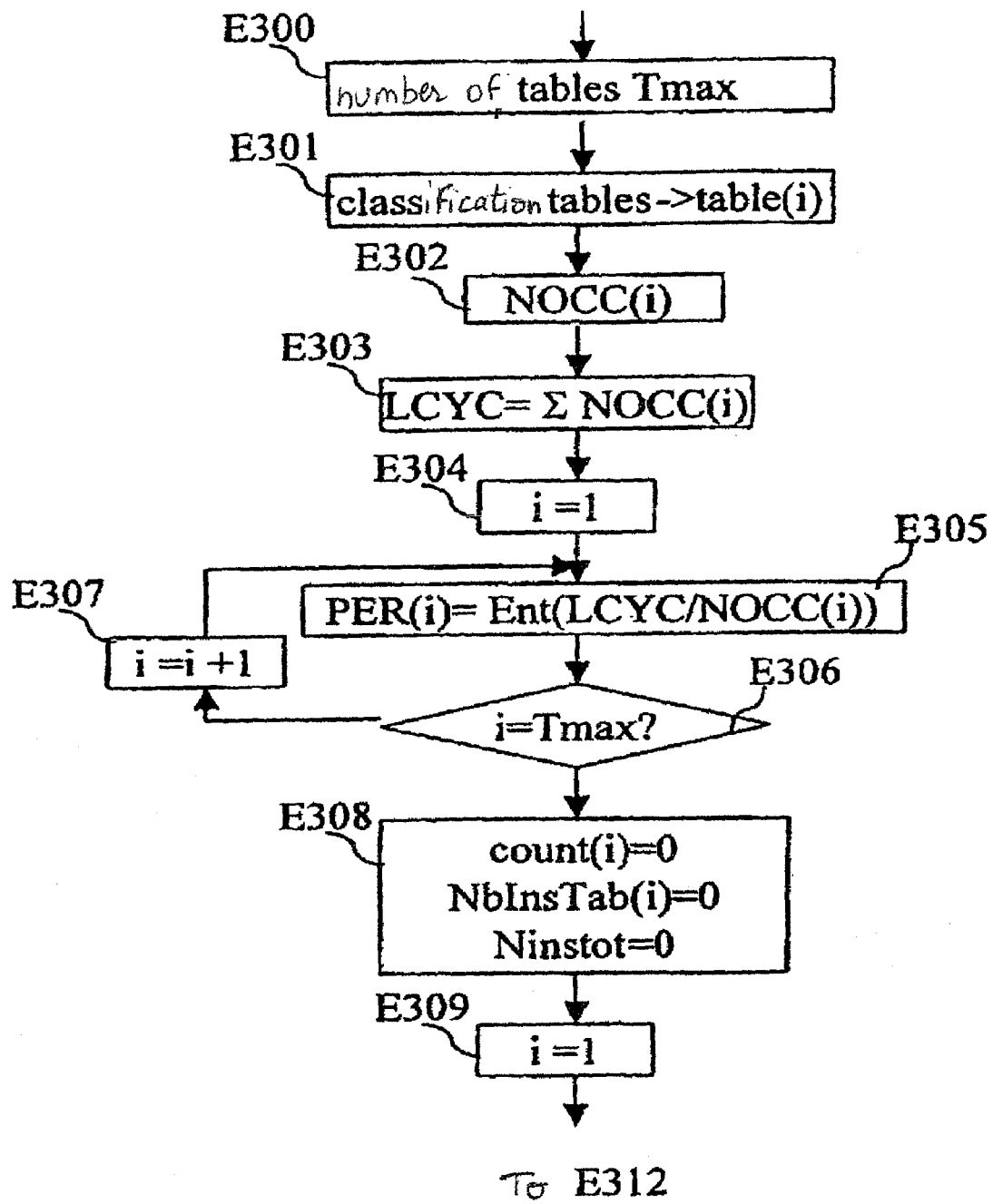
FIGS. 3a and 3b are flow diagrams of a preferred embodiment of a data insertion algorithm implemented by the transmission device according to the present invention.
Figure 3B:
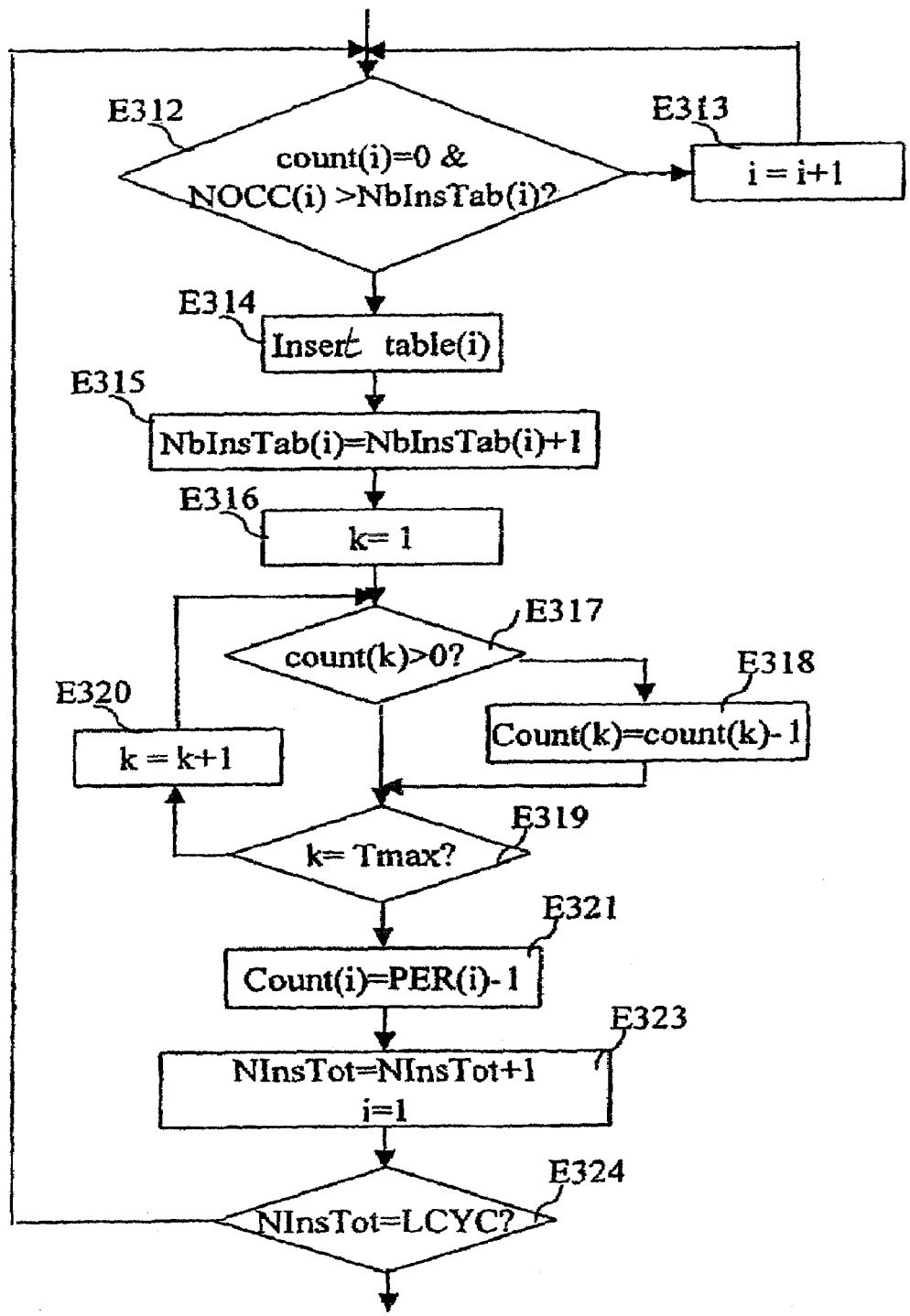

FIGS. 3a and 3b are diagrams of a preferred embodiment of the data transmission algorithm implemented by the transmission device according to the present invention.

The processor 200 of the transmission device or server 100 reads, from the memory 203, the program instructions corresponding to steps E300 to E324 of FIGS. 3a and 3b and loads them into the random-access memory 203 in order to execute them.

In step E300, the processor 200 of the server 100 determines the number Tmax of data groups that have to be inserted into the transmission cycle and transmitted to the users 150. The data groups are preferably shown in the form of tables.

By way of example, four tables have to be inserted into the transmission cycle. These tables are for example a table denoted TM4, a table denoted TMD, a table denoted TST and a table denoted TAV.

The table TM4 comprises data for configuring a means of decoding audiovisual information encoded in accordance with the MPEG4 standard. MPEG is the acronym for Moving Picture Experts Group.

The table TMD comprises data representative of the content of the transmitted audiovisual programmes. The table TMD comprises for example the metadata such as the guide to the transmitted audiovisual programmes, or to a predetermined audiovisual programme, data descriptive of this programme, such as its title, a summary and/or detailed description of the programme, a descriptor of one or more actors appearing in the audiovisual programme or one or more reviews of the programme.

The table TST comprises information for indicating transport of the audiovisual information. The table TST comprises, among other things, the Internet address for multicast or address for transmitting the audiovisual information to a plurality of users.

This address allows multiple users to receive the audiovisual programmes transmitted by the server 100 over the Internet network 130, provided said users have subscribed to such a service.

The table TAV comprises data representative of the attributes of the audiovisual information transmitted over the Internet network 130. These attributes are for example the format of the image, such as for example the 16/9 format or the 4/3 format.

Once this operation has been carried out, the processor 200 then passes to the next step E301.

In this step, the processor 200 orders the data tables TM4, TST, TMD and TAV according to their respective importance.

It should be noted here that the importance of each of the data tables is predefined, that is to say that an information item representative of the importance of each table is associated with each table.

According to one variant, the importance of each of the data tables is input by a supervisor via the keyboard 205 of the server 100.

The information item associated with each table and representative of the importance of the data contained in the data table with which it is associated is preferably a number representative of the number of insertions of the table with which it is associated into the transmission cycle.

For example, the information item representative of the table TST is the value four, the information item representative of the table TST is the value one, the information item representative of the table TM4 is the value two and the information item representative of the table TAV is the value one.

The processor 200 thus orders the tables TM4, TST, TMD and TAV as follows: since the table TST is the most important table it is classified as the first table, denoted table(1), since the table TM4 is the most important table of the tables that have not yet been classified it is classified as the second table, denoted table(2), and since the tables TMD and TAV are the tables of least importance they are respectively classified as the third and fourth tables, denoted respectively table(3) and table(4).

Once this operation has been carried out, in step E302 the processor 200 assigns the value of each representative information item associated with each table(i) to a variable denoted NOCC(i) where i is the respective rank of each classified table. The variable NOCC(i) is representative of the number of insertions of the data table with which it is associated. Thus, the variable NOCC(1) is equal to four, the variable NOCC(2) is equal to two, the variable NOCC(3) is equal to one and the variable NOCC(4) is equal to one.

Once this operation has been carried out, in step E303 the processor 200 calculates the total number of insertions LCYC that have to be made in the transmission cycle thus determined. This is done by adding the values of the variables NOCC(i) determined above.

According to our example, the total number of insertions LCYC is equal to the value eight.

Once this operation has been carried out, the processor 200 passes to the next step E304 and sets the variable i to the value one.

The processor 200 then passes to step E305 and determines the periodicity with which the table being processed is inserted into the transmission cycle.

The processor 200 determines this periodicity PER(i) by taking the whole of the result of the division of the total number of insertions LCYC by the number of insertions NOCC(i) corresponding to the table(i) being processed.

According to our example, the processor 200 determines the periodicity PER(1) of table(1) in the transmission cycle. This periodicity is in this case equal to two.

Once this operation has been carried out, in step E306, the processor 200 checks whether the variable i is equal to the number Tmax of data tables that have to be inserted.

If not, the processor increments the variable i by one unit in step E307 and returns to step E305 described above.

Steps E305 to E307 are thus repeated as many times as there are data tables to be inserted.

According to our example, the processor 200 determines the periodicity PER(2) of table(2) in the transmission cycle. This periodicity is in this case equal to four. The processor 200 also determines the periodicities PER(3) and PER(4) of table(3) and table(4). These periodicities are in our example equal to eight.

When the variable i is equal to the number Tmax of data tables that have to be inserted, the processor 200 passes to step E308.

In this step, the processor 200 initializes the variables count(1), count(2), count(3), count(4), NbInsTab(1), NbInsTab(2), NbInsTab(3), NbInsTab(4) and Ninstot to zero.

In the next step E309, the processor 200 initializes the variable i to the value 1 and passes to the next step E312 of FIG. 3b.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

The variable i represents the index of the data table being processed. The variable count(i) is the value of a counter associated with the data table being processed and is representative of the minimum number of insertions of other data groups before an insertion of the data group with which each counter is associated in the insertion cycle. The variable NbInsTab(i) is representative of the number of insertions of the data table that have already been made in the transmission cycle.

According to our example, the variable i is equal to the value one, the variable count(1) is equal to zero and the variable NbInsTab(1) is less than the variable NOCC(1), in this case equal to four. The processor 200 thus passes to the next step E314.

In this step, the processor 200 inserts the data table denoted table(1) into the transmission cycle for transmission of said table. This transmission will be described in more detail below with reference to FIG. 4.

Once this operation has been carried out, the processor 200 then passes to step E315 and increments the variable NbInsTab(i) by one unit. In this case, the variable NbInsTab(1) is set to the value 1.

Once this operation has been carried out, the processor 200 passes to the next step E316 and initializes a variable denoted k to the value one.

Once this operation has been carried out, in the next step E317 the processor 200 checks whether the variable count(k) is strictly positive.

If so, the processor 200 passes to step E318 and decrements the variable count(k) by one unit and then passes to step E319.

If the variable count(k) is zero or less than zero, the processor 200 passes to step E319.

It should be noted here that, as a variant, the check in step E317 is not carried out and the value of the counter count(i) is systematically decremented by one unit. The condition that the value count(i) is equal to zero in step E312 is in this variant replaced by the condition that this variable be less than or equal to zero.

In step E319, the processor 200 checks whether the variable k is equal to the number of data tables to be inserted.

If not, the processor 200 passes to step E320, increments the variable k by one unit and returns to step E317 described above.

The processor 200 repeats the loop formed by steps E317 to E320 until all the variables count(k) have been processed.

Thus, according to our example, the variables count(1), count(2), count(3) and count(4) are at the value zero.

Once these operations have been carried out, the processor 200 passes to step E321 and sets the variable count(i) associated with the table previously inserted in step E314 to the value equal to the periodicity PER(i) with which the current data table is inserted, decremented by one unit. This value corresponds to the minimum number of insertions of other data groups before an insertion of the current data group in the insertion cycle.

According to our example, the variable count(1) is thus set to the value one.

Once this operation has been carried out, the processor 200 then passes to the next step E323.

In this step, the processor 200 increments the variable NInsTot by one unit and sets the variable i to the value one.

Once this operation has been carried out, in the next step E324 the processor 200 checks whether the variable NinsTot is equal to the total number of insertions LCYC that have to be made in the transmission cycle.

If not, the processor 200 returns to step E312.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

According to our example, the variable i is equal to the value one and the variable count(1) is equal to one.

If the check in step E312 is negative, the processor 200 passes to step E313 and increments the variable i by one unit.

Once this operation has been carried out, the processor 200 passes to step E312.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

According to our example, the variable i is equal to the value two, the variable count(2) is equal to zero and the variable NOCC(2) equal to two is greater than the variable NbInsTab(2). The processor 200 therefore passes to the next step E314.

In this step, the processor 200 inserts the data table denoted table(2) into the transmission cycle for transmission of said table.

Once this operation has been carried out, the processor 200 carries out steps E315 to E320 in the same manner as described above.

Thus, according to our example, the variables count(1), count(2), count(3) and count(4) are at the value zero.

Once these operations have been carried out, the processor 200 passes to step E321 and sets the variable count(i) associated with the table previously inserted in step E314 to the value equal to the periodicity PER(i) with which the current data table is inserted, decremented by one unit.

According to our example, the variable count(2) is thus set to the value three.

Once this operation has been carried out, the processor 200 then passes to the next step E323.

In this step, the processor 200 increments the variable NInsTot by one unit and sets the variable i to the value one.

Once this operation has been carried out, in the next step E324 the processor 200 checks whether the variable NinsTot is equal to the total number of insertions LCYC that have to be made in the transmission cycle.

If not, the processor 200 returns to step E312.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

According to our example, the variable i is equal to the value one and the variable count(1) is equal to zero.

If the check in step E312 is positive, the processor 200 passes to step E314.

In this step, the processor 200 inserts the data table denoted table(1) into the transmission cycle for transmission of said table.

Once this operation has been carried out, the processor 200 carries out steps E315 to E320 in the same manner as described above.

Thus, according to our example, the variables count(1), count(3) and count(4) are at the value zero. The variable count(2) is then at the value 2.

Once these operations have been carried out, the processor 200 passes to step E321 and sets the variable count(1) associated with the table previously inserted in step E314 to the value equal to the periodicity PER(i) with which the current data table is inserted, decremented by one unit.

According to our example, the variable count(1) is thus set to the value one.

Once this operation has been carried out, the processor 200 then passes to the next step E323.

In this step, the processor 200 increments the variable NInsTot by one unit and sets the variable i to the value one.

Once this operation has been carried out, in the next step E324 the processor 200 checks whether the variable NinsTot is equal to the total number of insertions LCYC that have to be made in the transmission cycle.

If not, the processor 200 returns to step E312.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

According to our example, the variable i is equal to the value one and the variable count(1) is equal to one.

If the check in step E312 is negative, the processor 200 passes to step E313 and increments the variable i by one unit.

Once this operation has been carried out, the processor 200 passes to step E312.

In step E312, the processor 200 determines which table is to be inserted into the transmission cycle.

To do this, the processor 200 checks whether the value of the variable count(i) is equal to zero and whether the variable NOCC(i) is greater than the variable NbInsTab(i).

According to our example, the variable i is equal to the value two and the variable count(2) is equal to two.

If the check in step E312 is negative, the processor 200 passes to step E313 and increments the variable i by one unit.

Once this operation has been carried out, the processor 200 passes to step E312.

In this step, the processor 200 checks whether the value of the variable count(i) is equal to zero and whether the variable NOCC(i) is greater than the variable NbInsTab(i).

According to our example, the variable i is equal to the value three, the variable count(3) is zero and the variable NOCC(3) equal to one is greater than the variable NbInsTab (3). The processor 200 therefore passes to the next step E314.

In this step, the processor 200 inserts the data table denoted table(3) into the transmission cycle for transmission of said table.

Once this operation has been carried out, the processor 200 carries out steps E315 to E323 in the same manner as described above.

Once this operation has been carried out, in the next step E324 the processor 200 checks whether the variable NInsTot is equal to the total number of insertions LCYC that have to be made in the transmission cycle.

If not, the processor 200 returns to step E312.

The processor 200 thus carries out the loop consisting of steps E312 to E320 and inserts the various data tables a number of times corresponding to the importance of the data contained in these tables.

Thus, the data tables table(1), table(2), table(1), table(3), table(1), table(2), table(1) and table(4) are inserted chronologically.

It should be noted here that the algorithm as described above forms a transmission cycle in time and inserts the data groups into this cycle in real time as a function of their importance.

The data groups are inserted chronologically depending on their importance. The number of insertions made for each data group depends on its importance and the data groups inserted a number of times into the transmission cycle are spaced apart by a predetermined number of insertions of other data groups in the transmission cycle.

When the check E324 is positive, the processor 200 ends the insertion of the data groups into the determined insertion cycle. The processor 200 then returns to step E300 and repeats the algorithm consisting of steps E300 to E324.

The processor 200 repeats these steps immediately after step E324 or waits a predetermined amount of time before repeating these steps again.

Figure 4:
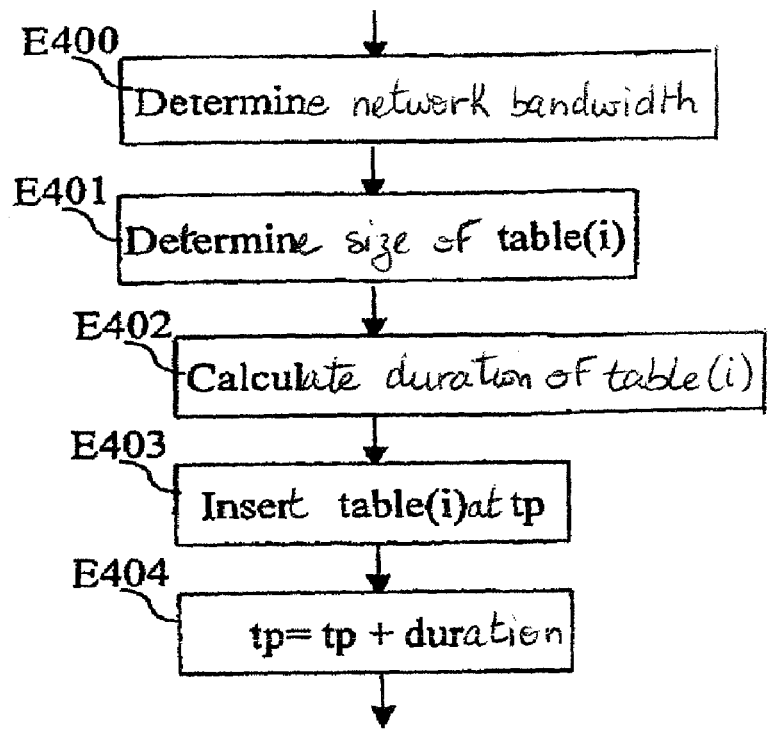
FIG. 4 is a flow diagram of a preferred embodiment of a data transmission algorithm implemented by the transmission device according to the present invention.

FIG. 4 is a flow diagram of the data transmission algorithm implemented by the transmission device according to a preferred embodiment of the present invention.

The processor 200 of the transmission device or server 100 reads, from the memory 203, the program instructions corresponding to steps E400 to E404 of FIG. 4 and loads them into the random-access memory 203 in order to execute them.

The algorithm of FIG. 4 is executed each time a data table is inserted into the transmission cycle in step E314 of the algorithm of FIG. 3b.

In step E400, the processor 200 of the server 100 determines the bandwidth of the telecommunication network 130. The bandwidth of the telecommunication network 130 is for example a predetermined bandwidth or a bandwidth set by the supervisor of the server 100.

In the next step E401, the processor 200 determines the size of the data table to be transmitted.

Once this operation has been carried out, in step E402 the processor 200 calculates the duration of transmission of the data table to be transmitted. This duration is calculated by dividing the size of the data table determined in step E401 by the bandwidth of the network determined in step E400.

In the next step E403, the processor 200 transmits the data table at the instant tp.

The instant tp is the instant at which the previous data table has been transmitted in its entirety over the Internet network. This instant tp has been calculated during transmission of the previous data table.

In step E404, the processor 200 calculates the instant tp for transmitting the next data table. This transmission instant is determined by adding the current transmission instant to the transmission duration calculated in step E402 described above.

Once this operation has been carried out, the algorithm of FIG. 4 ends and the processor 200 returns to step E315 of the algorithm of FIG. 3a.

Figure 5:
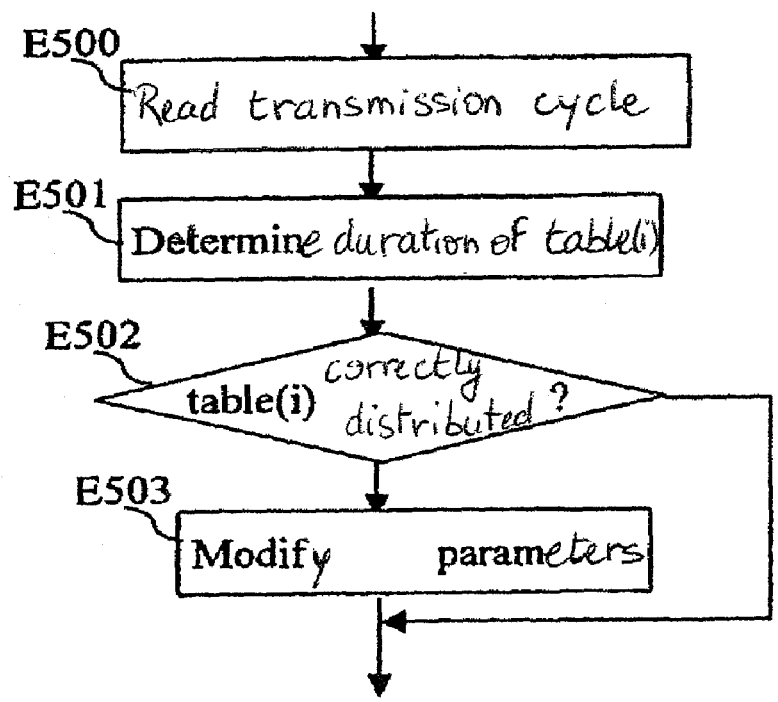
FIG. 5 is a flow diagram of a preferred embodiment of the transmission cycle analysis algorithm implemented by the transmission device according to the present invention.

FIG. 5 shows the transmission cycle analysis algorithm implemented by the transmission device according to the present invention.

The processor 200 of the transmission device or server 100 reads, from the memory 203, the program instructions corresponding to steps E500 to E503 of FIG. 5 and loads them into the random-access memory 203 in order to execute them.

Periodically, the processor 200 of the server 100 executes the present algorithm in parallel with the algorithms of FIGS. 3a, 3b and 4 described above.

This algorithm makes it possible to evaluate the pertinence of the parameters used to transmit data groups according to the present invention.

In step E500, the processor 200 reads the various data groups or data tables inserted in the transmission cycle and transmitted over the telecommunication network 130.

In step E501, the processor 200 then determines, for one or more data tables, the transmission duration of the data table or tables inserted in the transmission cycle in accordance with the algorithm of FIGS. 3a and 3b.

In the next step E502, the processor 200 checks whether the data table or tables are correctly distributed in the transmission cycle.

This is because, depending on the size of a data table and its importance, it may in some cases be necessary to modify the importance of this data table in order to guarantee a minimum insertion frequency of this table in the transmission cycle.

If the data table or tables are distributed correctly in the transmission cycle, the processor 200 ends the algorithm.

If the distribution is not correct, the processor 200 passes to step E503.

In this step, the processor 200 modifies the bandwidth of the transmission channel and/or modifies the information items representative of the importance of the data of one or more data tables and/or removes or adds tables from/to the transmission cycle.

Once this operation has been carried out, the processor 200 ends the algorithm.

Of course, the present invention is in no way limited to the embodiments described here but rather encompasses any variant within the reach of the person skilled in the art.

The invention claimed is:

1. Method of transmitting data associated with transmitted information over a communication network, wherein the data are divided into data groups, an information item representative of the importance of the data of the data group being associated with each data group, the method comprising forming a transmission cycle by inserting data groups into the transmission cycle by a processor, in an order which depends on their importance compared to the other data groups, at least one of the data groups being repeated at least one time during the transmission cycle, the number of repetitions of a particular data group during the transmission cycle depending on the respective importance of the data of the group, the number of occurrences of at least some of the different data groups during the transmission cycle being different according to said importance, the insertion comprising:

ordering the data groups as a function of their importance, associating a counter with each data group, the value in each counter being representative of the minimum number of insertions of other data groups before an insertion of the data group with which each counter is associated in the transmission cycle, determining the data group to be inserted as a function of the order of the data groups, the value of the associated counters and the number of times that at least one data group has been inserted into the transmission cycle, and transmitting said transmission cycle; the information being transmitted on a transmission channel of the communication network and the data being transmitted on a predetermined channel of the communication network which is different from the channel on which the information is transmitted.

2. Method according to claim 1, wherein the communication network includes a broadcast network and the information and data are transmitted over the broadcast network.

3. Method according to claim 1, further comprising transmitting the inserted data group each time a data group is inserted into the transmission cycle for the data groups.

4. Method according to claim 3, further including spacing the insertions of the data group by a predetermined number of insertions of other data groups into the transmission cycle.

5. Method according to claim 1, wherein each counter is set to a predetermined value prior to the first insertion of a data group into the transmission cycle, setting the counter associated with the inserted data group to a value equal to the number of insertions of other data groups, spacing apart the insertions of the data group with which the counter is associated, and decrementing the value of each counter associated with the other data groups each time a data group is inserted into the transmission cycle.

6. Method according to claim 5, further including (a) ascertaining whether (i) the value of the counter associated with the current data group is strictly greater than the predetermined value, or (ii) the current data group has been inserted into the transmission cycle a predetermined number of times the next data group of the ordered data groups is considered to be the current data group, and (b) taking the first of the ordered data groups as the current data group.

7. Method according to claim 6, further including determining the moment of insertion of a data group, on the basis of the size of the previously inserted data group or groups and on the bandwidth of the transmission channel.

8. Method according to claim 7, further comprising determining the total number of insertions of data groups to be inserted into the transmission cycle, and once the data groups have been inserted into the transmission cycle a number of times that is equal to the total number of insertions the method comprises the steps of:

waiting a predetermined period of time, determining a new transmission cycle, and inserting information groups into the determined new transmission cycle.

9. Method according to claim 8, wherein the predetermined period of time is zero.

10. Method according to claim 8, further comprising analyzing the transmission cycle including the inserted data groups and modifying the bandwidth of at least one of the transmission channel and the information items representative of the importance of the data of at least one data group as a function of the analysis of the transmission cycle.

11. Method according to claim 1, wherein the information is audiovisual information and the data include information for configuring a decoder of at least one of (a) the audiovisual information, (b) data representative of the content of the transmitted audiovisual information, (c) data for indicating the or each channel of the telecommunication network which comprises the transmitted information and (d) attribute data of the audiovisual information.

12. Method according to claim 1, further including dividing the data into data groups and associating with each data group an information item representative of the data group.

13. Device for transmitting data associated with transmitted information over a communication network, the data being divided into data groups, and an information item representative of the importance of the data of the data group being associated with each data group, the device comprising:

a processor programmed to form a transmission cycle by inserting data groups into the transmission cycle, in an order which depends on their importance compared to the other data groups, at least one of the data groups being repeated at least one time during the transmission cycle, the number of repetitions of a particular data group during the transmission cycle depending on the respective importance of the data of the group, the number of occurrences of at least some of the different data groups during the transmission cycle being different according to said importance, the processor also arranged for:

ordering the data groups as a function of their importance, associating a counter with each data group, the value in each counter being representative of the minimum number of insertions of other data groups before an insertion of the data group with which each counter is associated in the transmission cycle, determining the data group to be inserted as a function of the order of the data groups, the value of the associated counters and the number of times that at least one data group has been inserted into the transmission cycle, and a transmitter for transmitting said transmission cycle;

the transmitter being arranged for causing the information to be transmitted on a transmission channel of the communication network and the data to be transmitted on a predetermined channel of the communication network which is different from the channel on which the information is transmitted.

14. A processor programmed to performing the process of claim 1.

15. A storage medium or storage device including machine readable indicia for causing a computer arrangement to perform the method of claim 1.

* * * * *